UNITED STATES PATENT OFFICE.

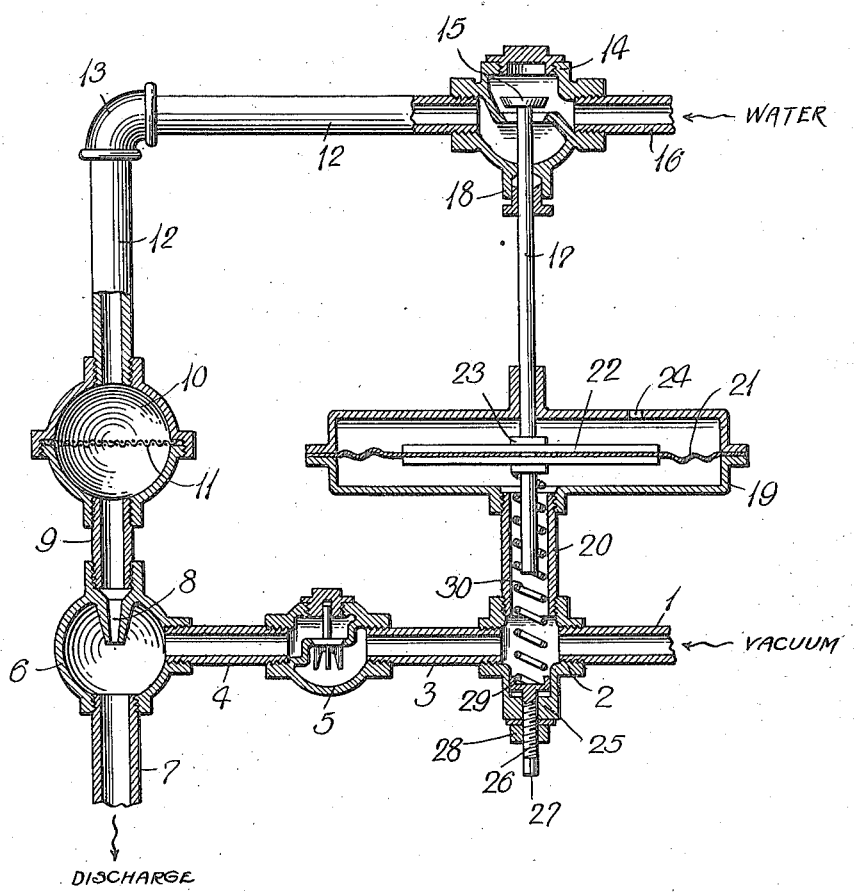

ALEXANDER DES ROCHER, OF DETROIT, MICHIGAN.

VACUUM-VALVE.

1,187,719.

Specification of Letters Patent.

Patented June 20, 1916.

Application filed July 6, 1914. Serial No. 849,357.

*To all whom it may concern:*

Be it known that I, ALEXANDER DES ROCHER, a citizen of the United States of America, residing at Detroit, in the county of Wayne and State of Michigan, have invented certain new and useful Improvements in Vacuum-Valves, of which the following is a specification, reference being had therein to the accompanying drawings.

This invention relates to a vacuum valve, and the primary object of my invention is to provide a diaphragm actuated valve wherein simple and effective means are employed for regulating the action of the diaphragm, and wherein a partial vacuum controls the pressure of water or motive fluid employed for producing a partial or complete vacuum.

A further object of this invention is to provide a novel vacuum controlled device that can be advantageously used in connection with heating systems and for removing air from pipe lines and such structures where the presence of air is considered a detriment to the operation of a system or apparatus.

I attain the above and other results by a simple, durable inexpensive mechanical construction that will be hereinafter specifically described and then claimed, and reference will now be had to the drawing wherein there is illustrated a vertical sectional view of a vacuum valve in accordance with this invention.

In the drawing, 1 denotes, by the way of an example, a vacuum pipe or conduit adapted to form part of a heating system or a similar apparatus, and such pipe has a four-way connection 2. Alining with the vacuum pipe 1 are pipes 3 and 4 connected by a conventional form of check valve 5. The pipe 3 is connected to the four-way connection 2 and the pipe 4 is connected to a spherical ejector casing 6 having a discharge pipe 7. Alining with the discharge pipe 7 is an ejector nozzle 8 forming part of the casing 6 and extending therein to discharge water or a motive fluid into the pipe and produce a suction or vacuum in the pipes 4, 3 and 1. The ejector casing 6 is connected by a pipe 9 to a sectional spherical strainer casing 10 and between the sections of said casing is a strainer or sieve 11. This strainer or sieve prevents solid and foreign matter from being discharged into the pipe 9 and the nozzle 8.

The strainer casing 10 is connected by pipes 12 and an elbow 13 to a valve body 14. The valve body may be of the gate, globe or any other suitable type which has a valvular member 15 controlling the passage through the valve body. The valve body has an inlet pipe 16 for water or motive fluid, and the valvular member 15 is carried by a stem 17, extending through a stuffing box 18, in the direction of the four-way connection 2. The valve stem 17 extends through a sectional diaphragm casing 19 supported by a pipe 20 of the four-way connection 2. Between the sections of the diaphragm casing 19 there is arranged a diaphragm 21, preferably made of metal and through which the valve stem 17 extends and is connected to said diaphragm by top and bottom plates 22 and nuts or washers 23. The top and bottom plates 22 are of smaller area than the diaphragm 21 and the top of the diaphragm casing has a port 24 whereby air will be admitted to the upper part thereof.

The four-way connection 2 has a closed end 25 and adjustably mounted in this end of the four-way connection is a screw 26. The outer end of the screw terminates in a shank 27 and is provided with a jam or lock nut 28 whereby the screw can be secured in adjusted position. The inner end of the screw 26 has a cup shaped head 29 to receive an end convolution of a coiled compression spring arranged within the four-way connection 2 and the pipe 20. The coiled compression spring extends into the diaphragm casing 19, encircling the end of the valve stem 17, and engaging the nuts or washers 23 at the bottom side of the diaphragm 21. The expansion force of the spring 30 is sufficient to retain the valvular member 15 in an open position; consequently, there is a supply of water or motive fluid to the ejector nozzle 8 and as the water is discharged from said nozzle a vacuum or suction is produced in the pipes 1, 3 and 4. The check valve is opened and the withdrawal of air from the pipe continues until the vacuum overcomes the pressure of the spring 30. This is accomplished through the medium of the diaphragm 21 and the valvular member 15 is closed or partially closed whereby the supply of water to the ejector nozzle 8 will be reduced or completely shut off. The check valve closes and prevents water or motive fluid from passing into the pipes 1 and 3.

I attach considerable importance to the screw 26 employed for regulating the tension of the spring 30, as it is through the medium of said screw and said spring that the operation of the device can be controlled and timed whereby a predetermined degree of suction or vacuum will actuate the valvular member 15, which controls the supply of water or motive fluid to the ejector.

In practice, it is preferable to use a gate valve whereby the valve can be opened and closed against pressure of a motive fluid, and it has been found that heating systems having a poor circulation can be brought up to the standard and the efficiency of the system materially increased by installing one of the devices. After such installation, it is only necessary to regulate the screw 26 until a proper circulation of hot water has been indicated and from then on the action of the device is automatic.

One embodiment of my invention has been illustrated, but it is to be understood that the structural elements are susceptible to such variations and modifications as fall within the scope of the appended claim.

What I claim is:—

A device of the type described comprising a vacuum pipe, a four-way connection carried thereby, an ejector in communication with said pipe at one end thereof and adapted to receive motive fluid to produce a suction in said pipe, a valve in communication with said ejector for controlling the supply of motive fluid thereto and having a depending valve stem, a diaphragm casing supported by said four-way connection between said connection and said valve and in communication with said connection, a diaphragm within said casing and connected to the valve stem of said valve and adapted to open and close said valve, a spring within said four-way connection and extending therethrough and into said casing and adapted to maintain said valve open during the reduction of the vacuum in said pipe, and means carried by said four-way connection for adjusting said means.

In testimony whereof I affix my signature in presence of two witnesses.

ALEXANDER DES ROCHER.

Witnesses:
 OTTO F. BARTHEL,
 ANNA M. DORR.